Feb. 19, 1946. G. COVEY 2,395,253
AUTOMATIC LAWN SPRINKLER
Filed April 13, 1944 3 Sheets-Sheet 1

Gus Covey INVENTOR.

BY
Victor J. Evans & Co.
ATTORNEYS

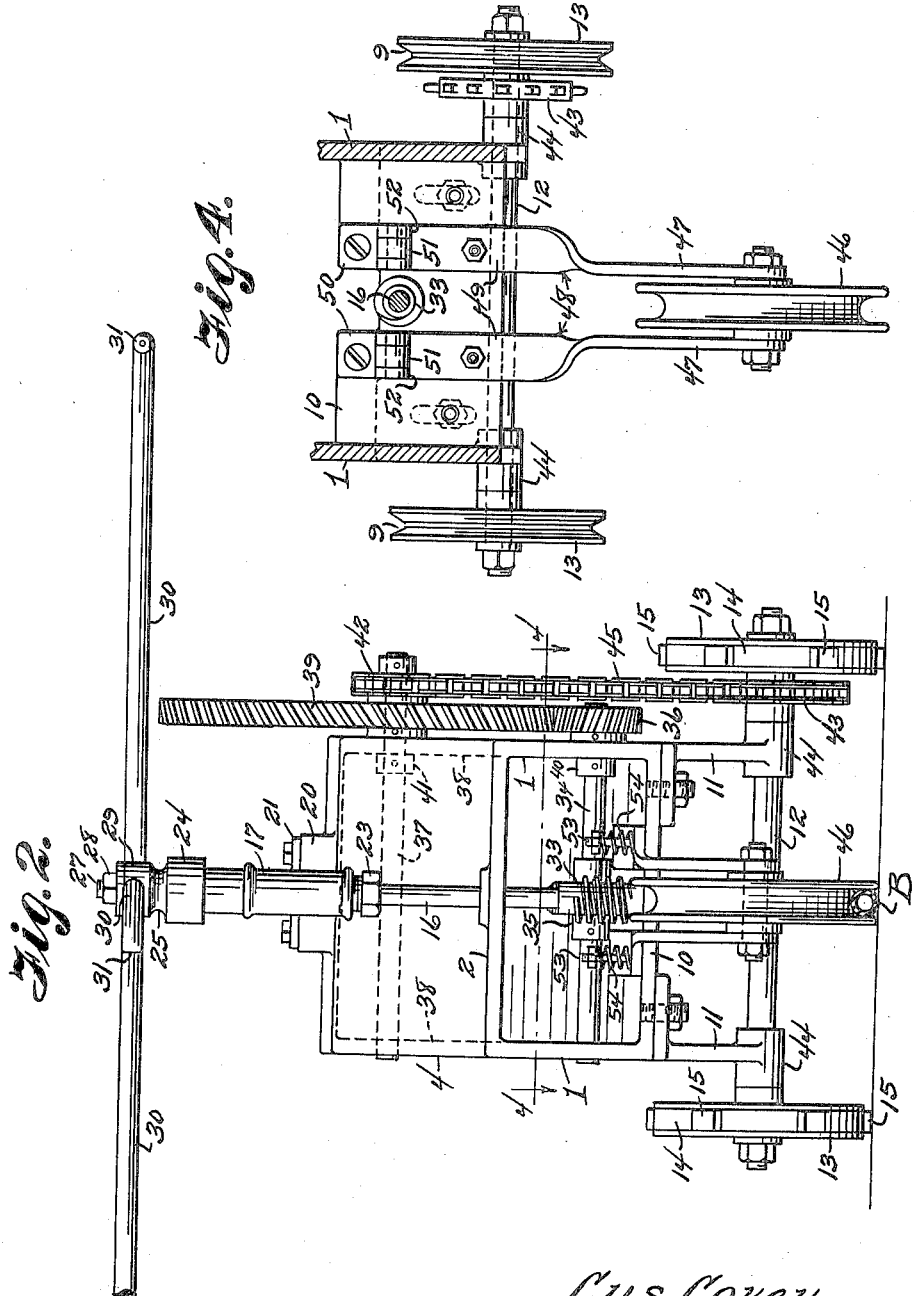

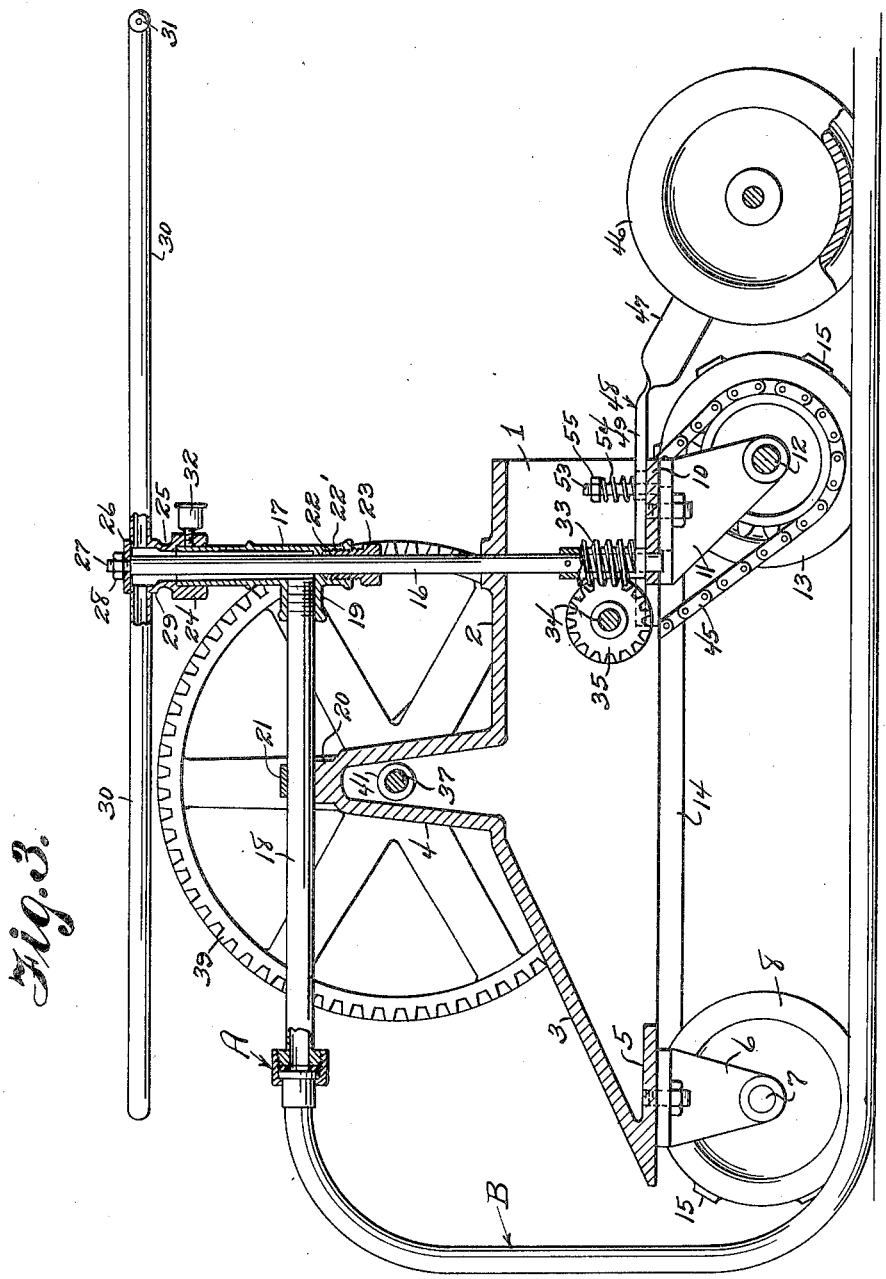

UNITED STATES PATENT OFFICE 2,395,253

AUTOMATIC LAWN SPRINKLER

Gus Covey, North Platte, Nebr.

Application April 13, 1944, Serial No. 530,868

7 Claims. (Cl. 299—50)

This invention relates to automatic lawn sprinklers, and its general object is to provide a sprinkling device that is propelled over a lawn or other surface, along a predetermined path, by the force of water utilized in sprinkling the surface, and the device is guided in its movement, by the hose which conveys the water thereto.

An important object is to provide an automatic sprinkling device that will not damage the lawn, as the traction means thereof is of the caterpillar type, and the tracks are of reinforced cushioning material such as rubber, yet provide ample traction to bring about travel of the device over uneven, rough and inclined surfaces.

A further object is to provide an automatic lawn sprinkler, that is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 2 is a front view thereof.

Figure 3 is a vertical longitudinal sectional view taken through the device.

Figure 4 is a sectional view taken approximately on line 4—4 of Figure 2, looking in the direction of the arrows.

Figure 1:
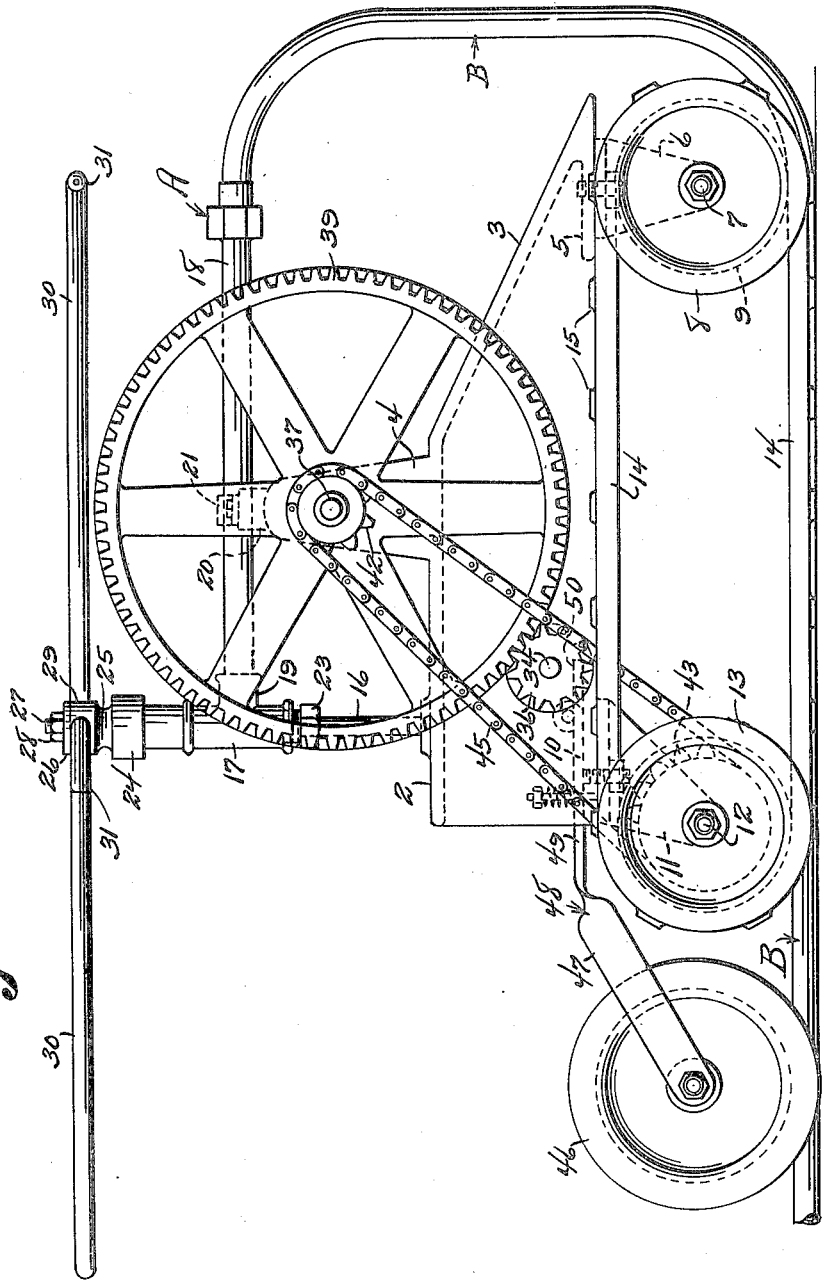
Figure 1 is a side elevation of the sprinkler which forms the subject matter of the present invention.

Referring to the drawings in detail, it will be noted that my device includes a casing like body preferably formed into a single unit to provide side walls 1, a horizontal front top wall portion 2, a rearwardly and downwardly inclined rear top wall portion 3 and a hollow cross sectional inverted substantially V-shaped upright 4, the latter extending throughout the width of the body between the portions 2 and 3, as best shown in Figure 2.

Formed on the side walls and the lower end of the rear top wall portion 3 to extend forwardly from the latter is a horizontal flange 5. Bolted to and depending from the end portions of the flange 5 is a pair of hanger brackets 6 having stub axles 7 fixed thereto and extending outwardly and laterally therefrom and journaled on the stub axles are wheels 8 which are flanged to provide circumferential V-shaped grooves 9.

Formed on and bridging the lower edges of the side walls at the forward portions thereof is a base plate 10 paralleling the flange 5 and bolted to and depending from the plate 10 for horizontal adjustment, is a pair of bearing brackets 11 having an axle 12 journaled in the bearings thereof. The axle 12 has wheels 13 keyed or otherwise fixed to the outer end portions thereof for rotation therewith, and the wheels 13 are likewise flanged to provide circumferential V-shaped grooves similar to the grooves 9, as shown in Figure 4. Trained about the wheels 8 and 13 are endless belt like tracks 14 formed from reinforced cushioning material such as rubber, and the tracks 14 are of course V-shape in cross section, to fit the grooves of the wheels. The outer faces of the tracks 14 have tread lugs 15 formed thereon to set up a gripping engagement with the ground.

Rotatably mounted in the base plate 10 is the lower end of a vertical shaft 16 that extends through the front top wall portion 2 and a considerable distance above the same. Sleeved on the shaft 16 adjacent the upper end thereof is the vertical portion 17 of a T-coupling that is supported by a horizontally disposed pipe 18 having one end threaded in the horizontal portion 19 of the coupling, the pipe extending rearwardly from the coupling and being seated in a recess provided in a block 20 that is formed centrally on the top of the upright 4. The pipe is secured in the seat by an eared U-clamp 21 bolted to the block, as best shown in dotted lines in Figure 1. The rear end of the pipe is formed with a threaded annular flange for receiving the conventional swiveled coupling A of a garden hose B.

The vertical portion 17 of the T-coupling is formed with an internal flange 22 adjacent the lower end thereof to provide a bearing for the shaft 16 and an abutment for a packing gasket 22' that is held in place by a gland nut 23 threaded in the lower end of the vertical portion, the latter of course being concentrically spaced from the shaft to allow for the passage of water about the same.

Rotatably mounted on the upper end of the vertical portion 17 is the lower skirt 24 of a cap of the discharge or sprinkling means, the skirt being formed with a shoulder at the juncture thereof, with the restricted intermediate portion 25 and the shoulder provides a seat for the upper end of the portion 17. The top 26 of the cap is seated upon a shoulder provided by the threaded reduced upper end 27 of the shaft 16, the said end providing a stud that extends through an opening in the top 26 and threaded on the stud is a nut 28 that fixes the cap to the shaft 16 for rotating the latter. Formed on and extending radially from the upper cylindrical portion 29 of the cap are equidistantly spaced tubular sprinkling arms 30 for passage of the water therethrough and the outer end portions of the arms are bent at right angles to the remaining portions thereof to provide discharge nozzles 31 that bring about rotation of the cap and consequently rotation of the shaft 16, it being obvious that the rotation is produced by the water being forced through the nozzles. A grease cup 32 is secured to the skirt of the cap for use in lubricating the parts, as will be apparent.

Fixed to the lower end portion of the shaft 16 is a worm 33 and rotatably mounted in and bridging the side walls 1 is a horizontal shaft 34 having a worm gear 35 fixed thereto and meshing with the worm, so that the shaft 34 is driven by the shaft 16. One end portion of the shaft 34 extends laterally from the housing and has fixed thereto a spiral pinion 36. A second horizontal shaft 37 is rotatably mounted in and bridges the side wall portions 38 of the upright 4 and one end portion of the shaft 37 extends laterally of the upright. Fixed to the extending end portion of the shaft 37 is a spiral gear 39 that meshes with the pinion 36. The shafts 34 and 37 are held against endwise movement by collars 40 and 41 respectively, that are secured to the shafts and bear against a side wall and side wall portion, as shown in Figure 2. Fixed to the extending end portion of the shaft 37 is a sprocket 42 and a sprocket 43 is fixed to the axle 12, between the bearing 44 of the adjacent bracket 11, and the wheel. A sprocket chain 45 is trained about the sprockets, and by that construction, it will be seen that the axle is rotated to bring about propulsion of the device, through the medium of the tracks 14.

In order to guide the device along the length of the hose 23, I provide a grooved wheel 46 that is journaled between the lower ends of the downwardly inclined lower portions 47 of a pair of spaced parallel strip like arms 48 that include horizontal upper portions 49 normally resting upon the upper face of the base plate 10. The arms are hingedly secured to the base plate to extend forwardly therefrom and are twisted at the juncture of the said portions 47 and 49, so that the flat faces of the latter portions will rest upon the base plate, as best shown in Figure 2. The hinges include leaves 50 that are bolted to the base plate, and the leaves are formed with barrels 51 that are pinned between spaced barrels 52 formed on the rear ends of the horizontal portions 49.

The arms 48 are spring pressed so as to maintain the wheel 46 engaged with the hose, regardless of the irregularity of the ground along which the device travels, and for that purpose, I provide a pair of bolts 53, one for each arm, the bolts being secured to and rising from the base plate. The bolts extend through slots disposed longitudinally of the upper portions 49 and sleeved on the bolts are coil springs 54 that bear against the portions 49 and nuts 55 threaded on the bolts, as clearly shown in Figure 3.

In the use of my device, the garden hose B is connected to a water supply pipe or hydrant and then placed on the area to be watered. The sprinkler will then be wheeled to the end of the hose to which is it to be coupled and then disposed in straddling relation to the hose, with the grooved wheel 46 mounted on the hose, the latter being coupled to the pipe 18. It will of course be understood that the hose is connected to a faucet or the like. The faucet is then opened and it will be obvious that passage of water through the sprinkling arms will rotate the same and cause the device to travel along the hose. Operation and travel of the device is controlled by the turning off and on of the water supply. After the area over which the hose has been placed has been watered, the hose is connected to another faucet and placed on another dry area and the operation previously described is repeated. However in small areas one run of the sprinkler may be found sufficient to thoroughly sprinkle the desired area. It will be further obvious that due to the ratio of the gear and pinion and the use of the worm and gear, that the device will travel very slowly along the hose, and thereby result in thoroughly wetting the surface traversed by the device.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An automatic lawn sprinkler comprising a body, said body having a horizontal front top wall and a rearwardly inclined rear top wall, a hollow substantially V-shaped upright formed at the junction of said front wall and said rear wall, a horizontal flange extending forwardly from the rear top wall portion, a base plate parallel to said flange and connecting the lower edges of the front portions of the side walls of said body, brackets secured to said flange and said plate, caterpillar traction means secured to said brackets and supporting the body, rotary sprinkling means carried by the body, means for conveying water from a hose to the sprinkling means for rotating the latter, means for driving the traction means from the sprinkling means, and means carried by the body and engaged with the hose for guiding the device along the hose.

2. An automatic lawn sprinkler comprising a body, said body having a horizontal front top wall and a rearwardly inclined rear top wall, a hollow substantially V-shaped upright formed at the junction of said front wall and said rear wall, a horizontal flange extending forwardly from the rear top wall portion, a base plate parallel to said flange and connecting the lower edges of the front portions of the side walls of said body, brackets secured to said flange and said plate, caterpillar traction means secured to said brackets and supporting the body, rotary sprinkling means carried by the body, means for conveying water from a hose to the sprinkling means for rotating the latter, means for driving the traction means from the sprinkling means, a pair of spring pressed arms hinged to the body and normally resting thereon, and a wheel journaled between the arms and provided with a circumferential groove therein to receive the hose for guiding the device along the hose.

3. An automatic lawn sprinkler comprising a body, said body having a horizontal front top wall and a rearwardly inclined rear top wall, a horizontal flange extending forwardly from the rear top wall portion, a base plate, parallel to said flange and connecting the lower edges of the front portions of the side walls of said body, brackets secured to said flange and said plate and depending from the body, axles mounted in the brackets, caterpillar traction means including wheels mounted on the axles, said wheels being provided with circumferential grooves, endless belt like ground engaging tracks trained about the wheels and mounted in the grooves, tread lugs formed on the tracks, rotatably mounted sprinkling means carried by the body, means for conveying water to the sprinkling means for rotating the latter, means for driving the traction means from the sprinkling means, and means for guiding the device along a predetermined path.

4. An automatic lawn sprinkler comprising a body, said body having a horizontal part top wall and a rearwardly inclined rear top wall, a horizontal flange extending forwardly from the rear top wall portion, a base plate parallel to said flange and connecting the lower edges of the front portions of the side walls of said body, brackets secured to said flange and said plate, traction means for the body secured to said flange and said plate, a vertical shaft journaled in the body and rising therefrom, rotary sprinkling means including water receiving tubular arms which are fixed to the upper end of the shaft for rotating the latter, means for conveying water to the arms to cause rotation thereof, a horizontal shaft journaled in the body and geared to the vertical shaft, a second horizontal shaft journaled in the body and geared to the first horizontal shaft, means for driving the traction means from the second horizontal shaft, and means for guiding the device along a predetermined path.

5. An automatic lawn sprinkler comprising a body, said body having a horizontal front top wall and a rearwardly inclined rear top wall, a horizontal flange extending forwardly from the rear top wall portion a base plate parallel to said flange and connecting the lower edges of the front portions of the side walls of said body, brackets secured to said flange and said plate, traction means for the body secured to said flange and said plate, a vertical shaft journaled in the body and rising therefrom, rotary sprinkling means including water receiving tubular arms which are fixed to the upper end of the shaft for rotating the latter, means for conveying water to the arms to cause rotation thereof, a horizontal shaft journaled in the body, a worm gear fixed to the horizontal shaft, a worm fixed to the vertical shaft and meshing with the gear, a second horizontal shaft journaled in the body, a pinion fixed to the first horizontal shaft, a gear fixed to the second horizontal shaft and meshing with the pinion, wheels included in the traction means, axles for said wheels, a sprocket fixed to the second horizontal shaft, a sprocket fixed to one of said axles, a chain trained about the sprockets to drive the traction means for propelling the device, and means whereby the device can be guided along a predetermined path.

6. An automatic lawn sprinkler comprising a body including a horizontal front top wall and a rearwardly inclined rear top wall, a horizontal flange extending forwardly from the rear top wall portion, a base plate parallel to said flange and bridging the lower edges of the front portions of the side walls of said body, brackets secured to said flange and said plates, an upright formed on and rising from the horizontal front top wall, a vertical shaft journaled in the body and rising above the top wall, a T-coupling including a vertical portion sleeved on the shaft and concentrically spaced therefrom, rotary sprinkling means, including a cap mounted for rotation on the upper end of said vertical portion, and water receiving tubular arms secured to and radiating from the cap the said arms being fixed to the shaft for rotating the same, a horizontal portion included in the T-coupling, a water conveying pipe secured to the upright and having one end connected to said horizontal portion for passage of water through the coupling to the sprinkling means, means on the opposite end of said pipe for attachment of the hose thereto, traction means secured to and supporting the body, means for driving the traction means from the shaft, and means whereby the device can be guided along a predetermined path.

7. An automatic lawn sprinkler comprising a casing like body including side walls, a horizontal front top wall portion, an inclined rear top wall portion and an upright portion between the top wall portions, a forwardly directed flange connecting the side walls and extending forwardly from the lower end of the inclined top wall portion, a plate parallel to the said flange connecting the side walls and underlying the horizontal top wall portion, pairs of brackets secured to and depending from the flange and plate, axles mounted in each pair of brackets, caterpillar traction means including grooved wheels mounted on the axles, endless belt like ground engaging tracks trained about the wheels and mounted in the grooves thereof, a shaft journaled in the body and rising from the top wall, rotary sprinkling means fixed to the upper end of the shaft for rotating the latter, means between the shaft and one of said axles for driving the traction means from said shaft, and means for conveying water to the sprinkling means and fixed to and supported by said upright portion.

GUS COVEY.